(12) United States Patent
Kyoshima et al.

(10) Patent No.: US 12,511,116 B2
(45) Date of Patent: Dec. 30, 2025

(54) DRIVING SUPPORT DEVICE, VEHICLE, DRIVING SUPPORT METHOD, AND STORAGE MEDIUM

(71) Applicant: HONDA MOTOR CO., LTD., Tokyo (JP)

(72) Inventors: Hiroyuki Kyoshima, Tokyo (JP); Makoto Nakatsuka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 194 days.

(21) Appl. No.: 18/368,267

(22) Filed: Sep. 14, 2023

(65) Prior Publication Data

US 2024/0111515 A1    Apr. 4, 2024

(30) Foreign Application Priority Data

Sep. 29, 2022    (JP) .................... 2022-156414

(51) Int. Cl.
*G06F 8/65* (2018.01)
*B60W 30/06* (2006.01)
*B60W 50/00* (2006.01)

(52) U.S. Cl.
CPC .............. *G06F 8/65* (2013.01); *B60W 30/06* (2013.01); *B60W 50/0097* (2013.01); *B60W 2556/30* (2020.02); *B60W 2556/50* (2020.02)

(58) Field of Classification Search
USPC ........................................................ 717/173
See application file for complete search history.

(56) References Cited

U.S. PATENT DOCUMENTS 6,480,783 B1 * 11/2002 Myr ................. G08G 1/096838
340/990
9,772,839 B2    9/2017 Hong
(Continued)

FOREIGN PATENT DOCUMENTS

CN    107315600 A * 11/2017
JP    2019185212 A * 10/2019
(Continued)

OTHER PUBLICATIONS

"Full Self-Driving Capability Subscriptions"; Tesla.com website [full URL in ref.] as captured by the Wayback Machine Internet Archive (arhive.org) on Sep. 29, 2022 (Year: 2022).*
(Continued)

*Primary Examiner* — Yuqing Xiao
*Assistant Examiner* — Clint Thatcher
(74) *Attorney, Agent, or Firm* — Thomas Horstemeyer, LLP

(57) ABSTRACT

The present invention provides a driving support device for supporting driving of a vehicle, the driving support device comprising: a detection unit configured to detect a current position of the vehicle; an acquisition unit configured to acquire data for updating a driving support function equipped on the vehicle; a control unit configured to control update of the driving support function based on the data acquired by the acquisition unit, wherein the control unit is configured to execute the update in a state in which an ignition of the vehicle is on, in a case of determining, based on the current position detected by the detection unit, that the update is to be completed before reaching a situation in which the driving support function may be activated.

17 Claims, 5 Drawing Sheets

| FUNCTION | CONCRETE EXAMPLE | EXISTENCE OR ABSENCE OF UPDATE IN IG-ON STATE | UPDATE ADDITION CONDITION |
|---|---|---|---|
| COLLISION PREVENTION SUPPORT | CMBS, RDM | X | — |
| TRAVEL SUPPORT (SPECIFIC ROAD SUPPORT) | LKAS, ACC | O | TRAVELING ON NORMAL ROAD |
| PARKING SUPPORT (LOW SPEED SUPPORT) | AUTOMATIC PARKING, MULTI-VIEW CAMERA SYSTEM | O | TRAVELING ON SPECIFIC ROAD |
| VISUAL SUPPORT | MULTI-VIEW CAMERA SYSTEM, LANE WATCH FUNCTION, CAMERA MONITOR SYSTEM | X | — |
| RECOGNITION SUPPORT | RADAR, CAMERA, SENSOR FUSION | X | — |

(56) References Cited

U.S. PATENT DOCUMENTS

| | | | |
|---|---|---|---|
| 10,055,217 B2 | 8/2018 | Hong | |
| 10,180,835 B2 | 1/2019 | Hong | |
| 10,776,098 B2 | 9/2020 | Hong | |
| 11,221,840 B2 | 1/2022 | Hong | |
| 11,597,398 B2 | 3/2023 | Okuda et al. | |
| 2016/0335073 A1 | 11/2016 | Hong | |
| 2017/0089721 A1* | 3/2017 | Akselrod | G01C 21/3407 |
| 2017/0357499 A1 | 12/2017 | Hong | |
| 2018/0307477 A1 | 10/2018 | Hong | |
| 2019/0219417 A1* | 7/2019 | Quint | G01C 21/3632 |
| 2019/0243632 A1 | 8/2019 | Hong | |
| 2019/0272164 A1* | 9/2019 | Yamamuro | G06F 8/65 |
| 2020/0387366 A1 | 12/2020 | Hong | |
| 2021/0146941 A1 | 5/2021 | Okuda et al. | |
| 2021/0224056 A1* | 7/2021 | John | H04W 4/46 |

FOREIGN PATENT DOCUMENTS

| | | |
|---|---|---|
| JP | 2020-004245 A | 1/2020 |
| JP | 6722198 B2 | 7/2020 |
| JP | 2021-081250 A | 5/2021 |
| WO | 2016183096 A1 | 11/2016 |

OTHER PUBLICATIONS

Japanese Office Action for Japanese Patent Application No. 2022156414 mailed Jun. 14, 2024 (partially translated).

* cited by examiner

FIG. 2

| | MANUAL DRIVING MODE | NORMAL SUPPORT MODE | EXTENDED SUPPORT MODE |
|---|---|---|---|
| ACC | × | ○ | ○ (with map) |
| ACC + LKAS | × | ○ | ○ (with map) |
| ALC | × | × | ○ (with map) |
| ALCA | × | × | ○ (with map) |

F I G. 4

| FUNCTION | CONCRETE EXAMPLE | EXISTENCE OR ABSENCE OF UPDATE IN IG-ON STATE | UPDATE ADDITION CONDITION |
|---|---|---|---|
| COLLISION PREVENTION SUPPORT | CMBS, RDM | × | — |
| TRAVEL SUPPORT (SPECIFIC ROAD SUPPORT) | LKAS, ACC | ○ | TRAVELING ON NORMAL ROAD |
| PARKING SUPPORT (LOW SPEED SUPPORT) | AUTOMATIC PARKING, MULTI-VIEW CAMERA SYSTEM | ○ | TRAVELING ON SPECIFIC ROAD |
| VISUAL SUPPORT | MULTI-VIEW CAMERA SYSTEM, LANE WATCH FUNCTION, CAMERA MONITOR SYSTEM | × | — |
| RECOGNITION SUPPORT | RADAR, CAMERA, SENSOR FUSION | × | — |

DRIVING SUPPORT DEVICE, VEHICLE, DRIVING SUPPORT METHOD, AND STORAGE MEDIUM

CROSS-REFERENCE TO RELATED APPLICATION(S)

This application claims priority to and the benefit of Japanese Patent Application No. 2022-156414 filed on Sep. 29, 2022, the entire disclosure of which is incorporated herein by reference.

BACKGROUND OF THE INVENTION

Field of the Invention

The present invention relates to a technique of controlling a vehicle.

Description of the Related Art

A function equipped on a vehicle can be updated using over the air (OTA) or the like. Japanese Patent No. 6722198 discloses a method for prioritizing (order of priority) data set transmission to an application (smartphone) in update of automobile software via the application.

In general, acquisition (download) of update data for updating a function equipped on a vehicle can be performed in a state where an ignition is turned on. Then, the updating (enabling, installing) of the function by the acquired update data can be executed in a state where the function is reliably stopped, that is, in a state where the ignition is turned off. However, when the execution of the function update is limited to the ignition off period, it takes a considerable amount of time (for example, several days) until the update is completed for all of the plurality of functions to which the update data is distributed, and some functions may not be updated until the next ignition on.

SUMMARY OF THE INVENTION

The present invention provides, for example, a technology capable of efficiently and safely updating a function equipped on a vehicle.

According to one aspect of the present invention, there is provided a driving support device for supporting driving of a vehicle, the driving support device comprising: a detection unit configured to detect a current position of the vehicle; an acquisition unit configured to acquire data for updating a driving support function equipped on the vehicle; a control unit configured to control update of the driving support function based on the data acquired by the acquisition unit, wherein the control unit is configured to execute the update in a state in which an ignition of the vehicle is on, in a case of determining, based on the current position detected by the detection unit, that the update is to be completed before reaching a situation in which the driving support function may be activated.

Further features of the present invention will become apparent from the following description of exemplary embodiments with reference to the attached drawings.

BRIEF DESCRIPTION OF THE DRAWINGS

FIG. 2 is a diagram illustrating driving support executed in each mode;

FIG. 4 is a diagram illustrating an example of a plurality of types of driving support functions equipped on the driving support device.

DESCRIPTION OF THE EMBODIMENTS

Figure 1:
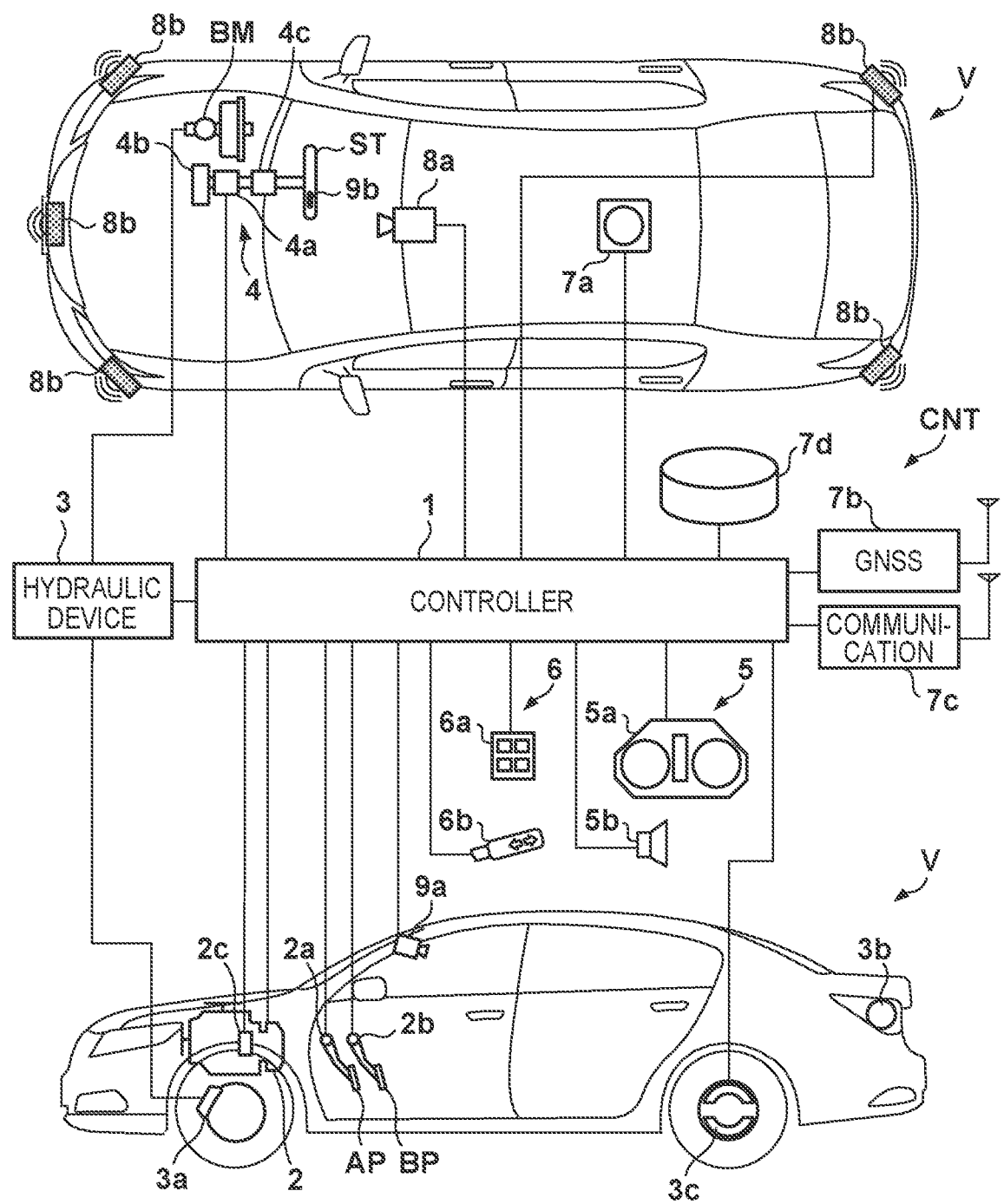
FIG. 1 is a block diagram of a vehicle and a control device thereof.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

A first embodiment according to the present invention will be described. FIG. 1 is a block diagram of a vehicle V and a control device CNT thereof according to the present embodiment. In FIG. 1, an outline of the vehicle V is illustrated by a plan view and a side view. The vehicle V of the present embodiment is, for example, a sedan-type four-wheel passenger vehicle, and may be, for example, a parallel hybrid vehicle. Note that the vehicle V is not limited to the four-wheeled vehicle, and may be a straddle type vehicle (motorcycle, automatic three-wheeled vehicle) or a large vehicle such as a truck or a bus.

[Configuration of Vehicle Control Device]

The control device CNT includes a controller 1 that is an electronic circuit that executes control of the vehicle V including driving support of the vehicle V. The controller 1 includes a plurality of electronic control units (ECUs). The ECU is provided for each function of the control device CNT, for example. Each ECU includes a processor represented by a central processing unit (CPU), a storage device such as a semiconductor memory, an interface with an external device, and the like. The storage device stores a program executed by the processor, data used for processing by the processor, and the like. The interface includes an input/output interface and a communication interface. Each ECU may include a plurality of processors, a plurality of storage devices, and a plurality of interfaces.

The controller 1 controls driving (acceleration) of the vehicle V by controlling a power unit (power plant) 2. The power unit 2 is a travel driving unit that outputs driving force for rotating driving wheels of the vehicle V, and can include an internal combustion engine, a motor, and an automatic transmission. The motor can be used as a drive source for accelerating the vehicle V, and can also be used as a generator at the time of deceleration or the like (regenerative braking).

In the case of the present embodiment, the controller 1 controls the output of the internal combustion engine or the motor or switches a gear ratio of the automatic transmission in accordance with a driving operation of a driver or vehicle speed detected by an operation detection sensor 2*a* provided on an accelerator pedal AP or an operation detection sensor 2*b* provided on a brake pedal BP. Note that the automatic transmission is provided with a rotation speed sensor 2c that detects the rotation speed of the output shaft of the automatic transmission as a sensor that detects the traveling state of the vehicle V. The speed of the vehicle V can be calculated from the detection result of the rotation speed sensor 2c.

The controller 1 controls braking (deceleration) of the vehicle V by controlling a hydraulic device 3. The driver's braking operation on the brake pedal BP is converted into hydraulic pressure in a brake master cylinder BM and transmitted to the hydraulic device 3. The hydraulic device 3 is an actuator capable of controlling a hydraulic pressure of a hydraulic oil supplied to a brake device 3a (for example, a disc brake device) provided on each of the four wheels on the basis of the hydraulic pressure transmitted from the brake master cylinder BM.

The controller 1 can control braking of the vehicle V by performing drive control of an electromagnetic valve or the like included in the hydraulic device 3. The controller 1 can also configure an electric servo brake system by controlling the distribution of the braking force by the brake device 3a and the braking force by the regenerative braking of the motor included in the power unit 2. The controller 1 may turn on a brake lamp 3b at the time of braking.

The controller 1 controls the steering of the vehicle V by controlling an electric power steering device 4. The electric power steering device 4 includes a mechanism that steers a front wheel according to the driver's driving operation (steering operation) on a steering wheel ST. The electric power steering device 4 includes a drive unit 4a including a motor that exerts a driving force (sometimes referred to as steering assist torque) for assisting steering operation or automatically steering the front wheels, a steering angle sensor 4b, a torque sensor 4c that detects steering torque (referred to as steering load torque and is distinguished from steering assist torque) borne by the driver, and the like.

The controller 1 controls an electric parking brake device 3c provided on the rear wheel. The electric parking brake device 3c includes a mechanism for locking the rear wheel. The controller 1 can control locking and unlocking of the rear wheel by the electric parking brake device 3c.

The controller 1 controls the information output device 5 that notifies information to the inside of the vehicle. The information output device 5 includes, for example, a display device 5a that notifies the driver of information by an image and/or a voice output device 5b that notifies the driver of information by a voice. The display device 5a can be provided on, for example, an instrument panel or a steering wheel ST. The display device 5a may be a head-up display. The information output device 5 may notify an occupant of information by vibration or light.

The controller 1 receives an instruction input from an occupant (for example, a driver) via an input device 6. The input device 6 is disposed at a position operable by the driver, and includes, for example, a switch group 6a for the driver to instruct the vehicle V and/or a winker lever 6b for operating a direction indicator (winker).

The controller 1 recognizes and determines a current position and a course (attitude) of the vehicle V. In the case of the present embodiment, the vehicle V is provided with a gyro sensor 7a, a global navigation satellite system (GNSS) sensor 7b, and a communication device 7c. The gyro sensor 7a detects rotational motion (yaw rate) of the vehicle V. The GNSS sensor 7b detects a current position of the vehicle V. In addition, the communication device 7c performs wireless communication with a server that provides map information and traffic information, and acquires these pieces of information. In the case of the present embodiment, the controller 1 determines the course of the vehicle V based on the detection results of the gyro sensor 7a and the GNSS sensor 7b, sequentially acquires highly accurate map information regarding the course from the server via the communication device 7c, and stores the map information in a database 7d (storage device). Note that the vehicle V may be provided with a sensor for detecting the state of the vehicle V, such as a speed sensor for detecting the speed of the vehicle V or an acceleration sensor for detecting the acceleration of the vehicle V.

The controller 1 executes driving support of the vehicle V based on detection results of various detection units provided in the vehicle V. The vehicle V is provided with surrounding detection units 8a to 8b, which are external sensors that detect the outside (surrounding situation) of the vehicle V, and in-vehicle detection units 9a to 9b, which are in-vehicle sensors that detect the situation (the state of the driver) inside the vehicle. The controller 1 can grasp the surrounding situation of the vehicle V based on the detection results of the surrounding detection units 8a to 8b, and execute driving support according to the surrounding situation. In addition, the controller 1 can determine whether the driver is performing a predetermined operation obligation imposed on the driver when executing the driving support based on the detection results of the in-vehicle detection units 9a to 9b.

The surrounding detection unit 8a is an imaging device (hereinafter, it may be referred to as a front camera 8a) that captures an image of the front of the vehicle V, and is attached to the vehicle interior side of the windshield at the front of the roof of the vehicle V, for example. The controller 1 can extract a contour of a target or a lane marking (such as a white line) on a road by analyzing an image captured by the front camera 8a.

The surrounding detection unit 8b is a millimeter wave radar (hereinafter, it may be referred to as a radar 8b), detects a target around the vehicle V using radio waves, and detects (measures) a distance to the target and a direction (azimuth) of the target with respect to the vehicle V. In the example illustrated in FIG. 1, five radars 8b are provided, one at the center of the front portion of the vehicle V, one at each of the left and right corner portions of the front portion, and one at each of the left and right corner portions of the rear portion.

Note that the surrounding detection unit provided in the vehicle V is not limited to the above configuration, and the number of cameras and the number of radars may be changed, or a light detection and ranging (LIDAR) for detecting a target around the vehicle V may be provided.

The in-vehicle detection unit 9a is an imaging device (hereinafter, it may be referred to as an in-vehicle camera 9a) that captures an image of the inside of the vehicle, and is attached to, for example, the vehicle interior side at the front of the roof of the vehicle V. In the case of the present embodiment, the in-vehicle camera 9a is a driver monitor camera that captures an image of the driver (for example, eyes and a face of the driver). The controller 1 can determine the direction of the line of sight and the face of the driver by analyzing an image (a face image of the driver) captured by the in-vehicle camera 9a.

The in-vehicle detection unit 9b is a grip sensor (hereinafter, it may be referred to as a grip sensor 9b) that detects grip of the steering wheel ST by the driver, and is provided in at least a part of the steering wheel ST, for example. As the in-vehicle detection unit, a torque sensor 4c that detects the steering torque of the driver may be used.

Examples of the driving support of the vehicle V include acceleration/deceleration support, lane keeping support, and lane change support. The acceleration/deceleration support is driving support (adaptive cruise control (ACC)) that controls acceleration/deceleration of the vehicle V within a predetermined vehicle speed while maintaining an inter-vehicle distance from a preceding vehicle by controlling the power unit 2 and the hydraulic device 3. The lane keeping support is a driving support (lane keeping assist system (LKAS)) that controls the electric power steering device 4 to keep the vehicle V inside the lane. The lane change support is driving support (auto lane changing (ALC), active lane change assist (ALCA)) for changing the traveling lane of the vehicle V to the adjacent lane by controlling the electric power steering device 4. In addition, the driving support executed by the controller 1 may include a collision mitigation brake system, an ABS function, traction control, and/or posture control of the vehicle V for supporting collision avoidance with a target (for example, a pedestrian, another vehicle, or an obstacle) on the road by controlling the hydraulic device 3.

The driving support (acceleration/deceleration support, lane keeping support, lane change support) of the vehicle V is executed in a plurality of driving modes including a manual driving mode, a normal support mode, and an extended support mode. FIG. 2 illustrates driving support executed in each of the manual driving mode, the normal support mode, and the extended support mode of the present embodiment. In the manual driving mode, the acceleration/deceleration support, lane keeping support, and lane change support are not executed, and manual driving of the vehicle V is performed by the driver.

In the manual driving mode, when an instruction to set the acceleration/deceleration support (ACC) is input by the driver via the input device 6 (for example, the switch group 6*a*), the acceleration/deceleration support is started, and the manual driving mode is shifted to the normal support mode. In the normal support mode, the lane keeping support (LKAS) can be executed in addition to the acceleration/deceleration support. The lane keeping support is started when an instruction input for setting the lane keeping support is made by the driver via the input device 6 (for example, the switch group 6*a*) during the setting of the acceleration/deceleration support. The acceleration/deceleration support and the lane keeping support are terminated when an instruction to cancel the setting is input by the driver via the input device 6 (for example, the switch group 6*a*).

In the normal support mode, the driver is required to perform predetermined operation obligations such as peripheral monitoring and steering wheel gripping. When it is determined that the driver does not perform the predetermined operation obligation on the basis of the detection result of the in-vehicle detection unit 9*b*, a notification for prompting the driver to perform the predetermined operation obligation is made via the information output device 5.

When traveling on a specific road is started during execution of the normal support mode, highly accurate map information is acquired by the communication device 7*c*. Then, when matching between the highly accurate map information and the image captured by the front camera 8*a* is successful, the normal support mode automatically transitions to the extended support mode. The specific road is a road that provides highly accurate map information, and examples thereof include an expressway and an automobile exclusive road. The highly accurate map information includes, in addition to normal information such as a route and a position of the specific road, information related to a detailed shape of the specific road such as presence or absence of a curve, a curvature, an increase or decrease of a lane, and a gradient in the specific road. When the mode shifts from the normal support mode to the extended support mode, the information output device 5 notifies that the mode has shifted to the extended support mode, for example, by changing the light emission color of the display device 5*a* provided on the steering wheel ST.

In the extended support mode, acceleration/deceleration support (and lane keeping support) in cooperation with highly accurate map information is performed. For example, on the basis of highly accurate map information, the controller 1 can perform acceleration/deceleration support more advanced than the normal support mode, such as decelerating the vehicle V before a curve or before a point where a lane decreases, or adjusting the speed of the vehicle V according to the curvature of the curve. Similarly to the normal support mode, the extended support mode also imposes a predetermined operation obligation on the driver, such as peripheral monitoring and steering wheel gripping. When it is determined that the driver does not perform the predetermined operation obligation on the basis of the detection result of the in-vehicle detection unit 9*b*, a notification for prompting the driver to perform the predetermined operation obligation is made via the information output device 5.

In addition, in the extended support mode, the lane change support can be further executed. In the case of the present embodiment, the lane change support includes the lane change support (auto lane changing (ALC)) led by the system that automatically changes the lane based on the determination of the controller 1, and the lane change support (active lane change assist (ALCA)) led by the driver that automatically changes the lane based on an instruction input from the driver. Note that, in both the system-based lane change support (ALC) and the driver-based lane change support (ALCA), when performing the lane change support, the driver is required to perform predetermined operation obligations such as peripheral monitoring and steering wheel gripping.

The system-based lane change support (ALC) is started when an instruction input for setting the ALC in the extended support mode is performed by the driver via the input device 6 (for example, the switch group 6*a*). During the ALC setting, the controller 1 sequentially determines whether it is necessary to execute a lane change in order to arrive at a destination set in advance by the driver on the basis of highly accurate map information (information such as increase/decrease or branching of a lane), and automatically performs the lane change when determining that it is necessary to execute the lane change. During the ALC setting, one or more lane changes can be executed according to the determination of the controller 1. The ALC ends when the vehicle arrives at the destination or when the specific road ends. The ALC may be ended in a case where an instruction input to cancel the setting is performed by the driver via the input device 6 (for example, the switch group 6*a*).

The driver-based lane change support (ALCA) is to perform one lane change in response to an instruction input by the driver, and is executed when the instruction input for instructing execution of ALCA in the extended support mode is performed by the driver via the input device 6 (for example, the winker lever 6*b*). In the ALCA, the driver can perform an instruction input in a direction for requesting a lane change via the input device 6 (winker lever 6*b*), and the controller 1 automatically performs a lane change to an adjacent lane in the direction in which the instruction is input by the driver. In the present embodiment, the ALCA can be executed on the basis of highly accurate map information, but is not limited thereto, and may be executed without using highly accurate map information. The ALCA can also be executed during the setting of system-based lane change support (ALC).

[Configuration of Driving Support Device]

Figure 3:
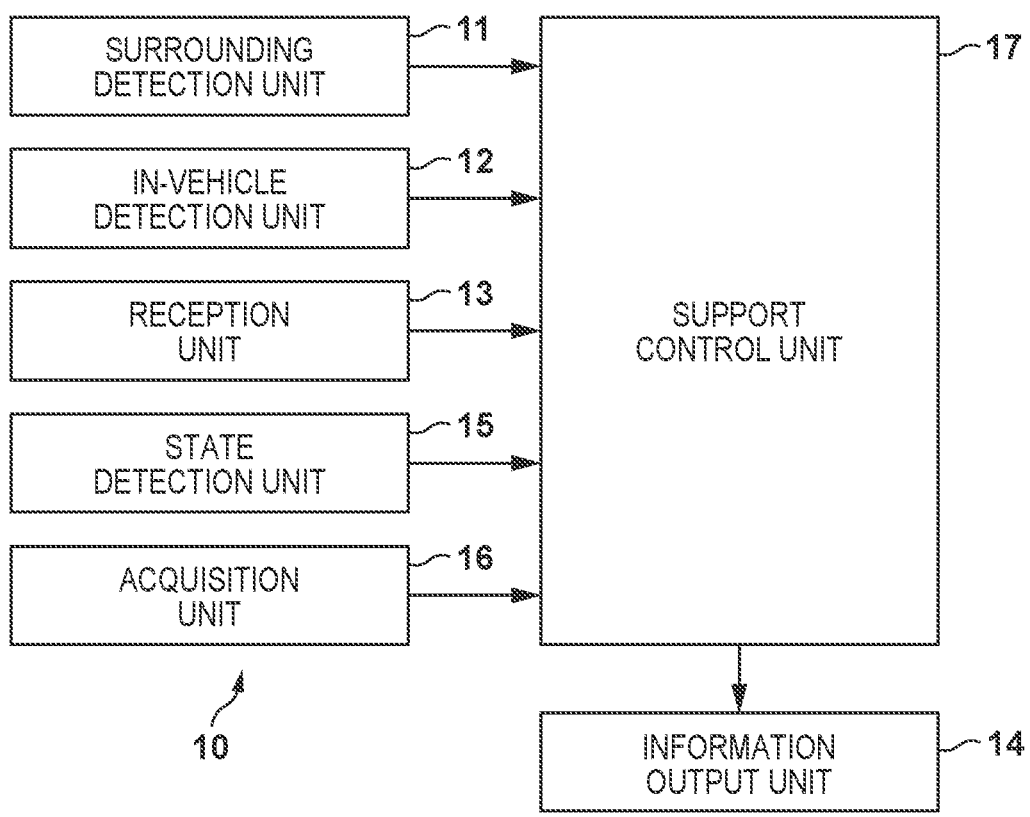
FIG. 3 is a block diagram illustrating a configuration example of a driving support device.

Hereinafter, a configuration example of a driving support device 10 of the present embodiment will be described with reference to FIG. 3. FIG. 3 is a block diagram illustrating a configuration example of the driving support device 10, and is obtained by extracting a configuration and a function particularly related to the present invention from the control device CNT described above. The driving support device 10 of the present embodiment is a device that supports driving of the vehicle V, and can include, for example, a surrounding detection unit 11, an in-vehicle detection unit 12, a reception unit 13, an information output unit 14, a state detection unit 15, an acquisition unit 16, and a support control unit 17. The units 11 to 17 of the driving support device 10 are communicably connected to each other via a system bus.

The surrounding detection unit 11 includes the front camera 8a and the radar 8b illustrated in FIG. 1, and detects the surrounding situation of the vehicle V. In the case of the present embodiment, the surrounding detection unit 11 can also detect a target (for example, an obstacle, another vehicle, or a pedestrian) around the vehicle V and measure the distance to the detected target and the position/direction of the target with respect to the vehicle V.

The in-vehicle detection unit 12 includes the in-vehicle camera 9a and the grip sensor 9b illustrated in FIG. 1, and detects the state of the driver of the vehicle V. In the case of the present embodiment, the in-vehicle detection unit 12 can detect the line of sight and the direction of the face of the driver by capturing the driver (for example, the eyes and the face of the driver) by the in-vehicle camera 9a and analyzing the image obtained by the capturing. In addition, the in-vehicle detection unit 12 can detect a grip state (that is, whether the steering wheel ST is gripped) of the steering wheel ST of the driver by the grip sensor 9b.

The reception unit 13 includes the input device 6 (switch group 6a, winker lever 6b) illustrated in FIG. 1, and receives an instruction input for instructing a setting related to various types of driving support from the occupant (driver). In addition, the information output unit 14 is the information output device 5 (display device 5a and voice output device 5b) illustrated in FIG. 1, and notifies the occupant (driver) of information regarding various types of driving support.

The state detection unit 15 detects the traveling state of the vehicle V. In the case of the present embodiment, the state detection unit 15 includes the GNSS sensor 7b illustrated in FIG. 1 and detects the current position of the vehicle V as the traveling state. The state detection unit 15 may include the gyro sensor 7a illustrated in FIG. 1 and detect the rotational motion of the vehicle V as the traveling state. In addition, the state detection unit 15 may include a speed sensor (rotation speed sensor 2c) and/or an acceleration sensor, and may detect the speed and/or acceleration of the vehicle V as the traveling state.

The acquisition unit 16 includes the communication device 7c illustrated in FIG. 1, and acquires various data from the server by performing wireless communication with the server using over the air (OTA) or the like. In the case of the present embodiment, the acquisition unit 16 acquires data (update data) for updating various driving support functions. The update data is provided from the server at an arbitrary timing. Note that the update data may be understood as an update program for updating a soft wafer of various driving support functions.

The support control unit 17 is constituted by a computer including a processor represented by a central processing unit (CPU), a storage device such as a semiconductor memory, an interface with an external device, and the like, and functions as a part of the controller 1 (ECU) illustrated in FIG. 1. The storage device stores a program (driving support program) for controlling various driving support functions in the vehicle V, and the support control unit 17 reads and executes the driving support program stored in the storage device.

The support control unit 17 of the present embodiment controls various driving support functions on the basis of the detection result of the surrounding detection unit 11. With respect to a driving support function in which a predetermined operation obligation is imposed on the driver, the support control unit 17 executes the driving support function when it is determined that the driver has performed the predetermined operation obligation on the basis of the detection result of the in-vehicle detection unit 12. Although described in detail later, the support control unit 17 acquires (downloads) update data of various driving support functions by the acquisition unit 16, stores the update data in the storage device, and updates (enabling, installing) the various driving support functions by the update data.

[Update of Driving Support Function]

The driving support device 10 is equipped with a plurality of types of driving support functions, and the support control unit 17 controls the vehicle V by each of the plurality of types of driving support functions. FIG. 4 illustrates an example of a plurality of types of driving support functions equipped on the driving support device 10. The plurality of types of driving support functions may include a collision avoidance function, a specific road support function, a low speed support function, a visual support function, and a recognition support function.

The collision avoidance support function is a function of supporting collision avoidance with a target on a road, and may include a collision mitigation brake system (CMBS), a road departure mitigation (RDM), and the like. The travel support function (specific road support function) is a function of supporting traveling on a specific road, and may include a lane keeping assist system (LKAS), an adaptive cruise control (ACC), and the like. As described above, the specific road is a road on which highly accurate map information is provided, and examples thereof include an expressway and an automobile exclusive road. Furthermore, a parking support function (low speed support function) is a function of supporting parking of the vehicle V in a parking lot, and may include an automatic parking function, a multi-view camera system, and the like. The multi-view camera system is a function of displaying a video around the vehicle V on the information output device 5 (display device 5a) using a camera provided in the vehicle V.

The visual support function is a function of supporting driver's vision, and may include a multi-view camera system, a lane watch function, a camera monitor system, and the like. A lane watch function and a camera monitor system are functions of displaying a video on the rear side of the vehicle V on the information output device 5 (display device 5a) using a camera provided in the vehicle V. Furthermore, the recognition support function is a function for supporting recognition of the surrounding of the vehicle V, and may include functions of the camera 8a and the radar 8b themselves, sensor fusion, and the like.

In such various driving support functions, in order to enhance and/or improve the function, update data for updating the function is provided (distributed) from an external server at an arbitrary timing, and the function can be updated (enabling, installing) by the update data. In general, the acquisition (download) of the update data from the server can be performed in a state where the ignition of the vehicle V is turned on. Then, the updating of the function by the acquired update data can be executed in a state where the function is reliably stopped, that is, in a state where the ignition of the vehicle V is turned off. However, when the execution of the function update is limited to the ignition off period, it takes a corresponding time (for example, several days) until the update is completed for all of the plurality of driving support functions to which the update data is provided, and some driving support functions may not be updated until the next ignition on.

Therefore, when determining that the update of the driving support function is to be completed before reaching a situation in which the driving support function may be activated, the support control unit 17 of the present embodiment executes the update (enabling, installing) of the driving support function in a state where the ignition of the vehicle V is on. Hereinafter, a method for updating the driving support function in the present embodiment will be described. In the present embodiment, an example in which the vehicle V arrives at a candidate location where the driving support function may be activated will be described as a situation where the driving support function may be activated. The candidate location is a candidate of a location (place, area) where the driving support function may be activated, and may be simply referred to as a "candidate location" below. There may be a plurality of candidate locations, and for example, the candidate locations are set (specified) in map information acquired in advance by the acquisition unit 16 (communication device 7c).

Figure 5:
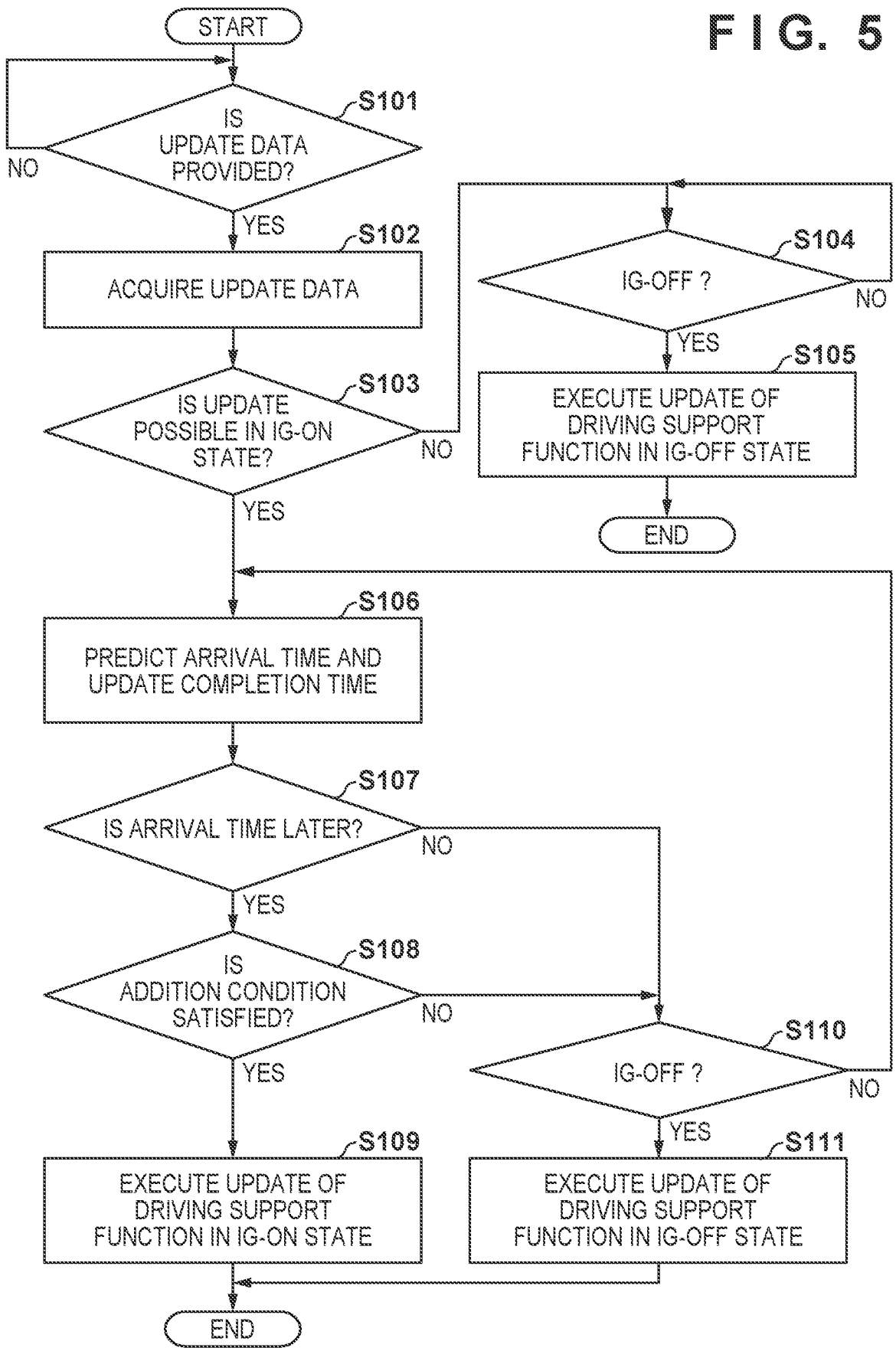
FIG. 5 is a flowchart showing a method for updating a driving support function.

FIG. 5 is a flowchart illustrating a method for updating the driving support function of the present embodiment, and can be executed by the support control unit 17 when the driving support program is executed in the driving support device 10. The flowchart illustrated in FIG. 5 is started in a state where the ignition of the vehicle V is turned on, and can be individually executed for each of a plurality of types of driving support functions. In the following description, the term "driving support function" refers to one driving support function of interest among a plurality of types of driving support functions equipped on the driving support device 10 (vehicle V). In the following description, a state in which the ignition of the vehicle V is on may be referred to as an "IG-ON state", and a state in which the ignition of the vehicle V is off may be referred to as an "IG-OFF state".

In Step S101, the support control unit 17 determines whether update data of the driving support function is provided from the server. For example, the support control unit 17 can determine that the update data is provided when the acquisition unit 16 receives a notification (information) indicating that the update data is provided from the server. In a case where it is determined that the update data is provided, the process proceeds to Step S102.

In Step S102, the support control unit 17 causes the acquisition unit 16 to acquire (download) update data of the driving support function from the server. For example, in the IG-ON state, the support control unit 17 can acquire the update data from the server by performing wireless communication with the server using the OTA or the like by the acquisition unit 16.

In Step S103, the support control unit 17 determines whether the driving support function of which the update data is acquired in Step S102 is a function that can be updated (enable, installable) in the IG-ON state. Whether the update is possible in the IG-ON state is set in advance for various driving support functions as illustrated in FIG. 4. For example, updating in the IG-ON state is avoided because a collision prevention support function may work at any time in the IG-ON state. The same applies to the visual support function and the recognition support function. Meanwhile, the travel support function (specific road support function) has a possibility of operating only on a specific road (expressway, automobile exclusive road) on which highly accurate map information is provided, and has a low possibility of operating on a road (for example, a general road) other than the specific road. In addition, there is a possibility that the parking support function is activated only at a location (place) having a parking lot, and there is a low possibility that the parking support function is activated on a specific road where the vehicle V cannot be parked. Therefore, the travel support function and the parking support function can be updated in the IG-ON state under a predetermined condition.

In Step S103, when the support control unit 17 determines that the driving support function cannot be updated in the IG-ON state, that is, the updating cannot be executed in the IG-ON state, the process proceeds to Step S104. In Step S104, the support control unit 17 determines whether the ignition of the vehicle V is turned off (IG-OFF). When the ignition of the vehicle V is turned off, the process proceeds to Step S105. In Step S105, the support control unit 17 executes (starts) the update of the driving support function in the IG-OFF state based on the update data acquired in Step S102. Meanwhile, when the support control unit 17 determines in Step S103 that the driving support function can be updated in the IG-ON state, the process proceeds to Step S106.

In Step S106, the support control unit 17 predicts an arrival time (first time) at which the vehicle V reaches the candidate location and an update completion time (second time) at which the update of the driving support function based on the update data is completed. Here, examples of the candidate location related to the travel support function include the specific road (entrance of the specific road). Furthermore, examples of the candidate locations related to the parking support function include a parking lot of a store, a rest facility (service area, parking area) on a specific road, a parking lot of a home, and the like.

The support control unit 17 can predict the arrival time by calculating the distance between the current position and the candidate location on the basis of the current position of the vehicle V detected by the state detection unit 15. Specifically, the support control unit 17 can predict the arrival time by obtaining a distance between the current position of the vehicle V and the candidate location closest to the vehicle V on the basis of map information acquired in advance, and adding a time obtained by dividing the distance by an arbitrary speed to the current time. As the arbitrary speed, a legal speed included in the map information may be used, or an average value of the speeds of the vehicle V detected by the state detection unit 15 so far may be used. The prediction of the arrival time may be performed using a known calculation method used in a car navigation system or the like. In addition, the support control unit 17 can predict the update completion time by obtaining the data size of the update data acquired by the acquisition unit 16 in Step S102. The prediction of the update completion time may be performed using a known calculation method used when an update program is installed in a computer or the like.

In Step S107, the support control unit 17 determines whether the arrival time is later than the update completion time by comparing the arrival time predicted in Step S106 with the update completion time. This determination may be understood to determine whether the update of the driving support function using the update data is to be completed before the vehicle V reaches the candidate location (for example, the candidate location closest to the vehicle V). When the arrival time is later than the update completion time, it is determined that the update of the driving support function is to be completed before the vehicle V reaches the candidate location, and the process proceeds to Step S108. Meanwhile, when the arrival time is earlier than the updatable time, that is, when the updatable time is later than the arrival time, it is determined that the update of the driving support function is not to be completed before the vehicle V reaches the candidate location, and the process proceeds to Step S110.

Here, in the present embodiment, the arrival time and the updatable time are predicted, but not limited to the time, the time may be predicted. In this case, in Step S106, the support control unit 17 predicts the arrival time required for the vehicle V to reach the candidate location and the update time required for the update of the driving support function based on the update data to be completed. Then, in Step S107, the support control unit 17 compares the predicted arrival time with the update time, and in a case where the arrival time is longer than the update time, it is determined that the update of the driving support function is to be completed before the vehicle V reaches the candidate location.

Further, in the present embodiment, it is determined whether the update of the driving support function is to be completed before the vehicle V reaches the candidate location by comparing the arrival time with the updatable time. However, the determination may be made according to the distance from the current position of the vehicle V to the candidate location. For example, the support control unit 17 obtains a distance from the current position of the vehicle V detected by the state detection unit 15 to the candidate location on the basis of map information acquired in advance, and determines that the update of the driving support function is to be completed before the vehicle V reaches the candidate location in a case where the distance is equal to or greater than a threshold value. The threshold value can be determined as a travel distance (hereinafter, simply referred to as a "travel distance" in some cases) obtained when it is assumed that the vehicle V travels at an arbitrary speed in an update time required to complete update of the driving support function by the update data. The support control unit 17 may determine the threshold value by sequentially calculating the update time and the travel distance, or may acquire information indicating the relationship between the data size and the travel distance in advance and determine the travel distance obtained from the information as the threshold value according to the data size of the update data acquired in Step S102. As the arbitrary speed, as described above, the legal speed included in the map information may be used, or the average value of the speeds of the vehicle V detected by the state detection unit 15 so far may be used.

In Step S108, the support control unit 17 determines whether an additional condition for permitting the update of the driving support function is satisfied. As illustrated in FIG. 4, the additional condition can be individually set for various driving support functions. When it is determined that the additional condition is satisfied, the process proceeds to Step S109, and the support control unit 17 executes (starts) the update of the driving support function in the IG-ON state based on the update data acquired in Step S102. Meanwhile, when it is determined that the additional condition is not satisfied, the process proceeds to Step S110. Step S108 is omitted for the driving support function having no additional condition.

For example, the travel support function (specific road support function) operates while traveling on a specific road, and does not operate while traveling on a road other than the specific road. Therefore, the additional condition (first additional condition) for permitting the update of the travel support function may include that the vehicle V is traveling on a road (for example, a general road) other than the specific road. In addition, since there is a possibility that the vehicle V enters the specific road before the update of the travel support function is completed, the first additional condition may further include that the distance from the current position of the vehicle V detected by the state detection unit 15 to the entrance (for example, an interchange) of the specific road is a first predetermined value or more. Similarly to the threshold value described above, the first predetermined value can be determined as a travel distance obtained when the vehicle V is assumed to travel at an arbitrary speed in the update time required to complete the update of the travel support function based on the update data.

The parking support function operates in a parking lot or the like, and does not operate during traveling on a specific road. Therefore, the additional condition (second additional condition) for permitting the update of the parking support function may include that the vehicle V is traveling on the specific road. In addition, since there is a possibility that the vehicle V leaves the specific road or enters a rest facility (for example, a service area or a parking area) of the specific road before the update of the parking support function is completed, the second additional condition may further include that a distance from a current position of the vehicle V detected by the state detection unit 15 to an exit (for example, an interchange) or a rest facility of the specific road is the second predetermined value or more. Similarly to the threshold value described above, the second predetermined value can be determined as a travel distance obtained when it is assumed that the vehicle V travels at an arbitrary speed in the update time required until the update of the parking support function by the update data is completed.

In addition, the additional condition may include that a user of the vehicle V has a right necessary for updating the driving support function. The right may occur when the user performs a duty necessary for updating the driving support function. Examples of the duties include application for update of the driving support function and/or payment of fees by money, benefit points, other benefits equivalent to money, and the like. The support control unit 17 can determine that the additional condition is satisfied (that is, update of the driving support device is permitted) when the acquisition unit 16 (communication device 7c) performs wireless communication with the server and confirms that the user of the vehicle V has the right necessary for updating the driving support function.

In Step S110, the support control unit 17 determines whether the ignition of the vehicle V is turned off (IG-OFF). When the ignition of the vehicle V has not yet been turned off, the process returns to Step S106, and when the ignition of the vehicle V has been turned off, the process proceeds to Step S111. In Step S111, the support control unit 17 executes (starts) the update of the driving support function in the IG-OFF state based on the update data acquired in Step S102.

As described above, the driving support device 10 (support control unit 17) of the present embodiment determines whether the update of the driving support function using the update data is completed before the vehicle V reaches the candidate location on the basis of the current position of the vehicle V detected by the state detection unit 15. Then, when it is determined that the update of the driving support function is to be completed before the vehicle V reaches the candidate location, the update is executed in the IG-ON state. As a result, since the functions of some driving support functions are updated in the IG-ON state, it is possible to efficiently update various driving support functions equipped on the driving support device 10. In addition, since the update of the driving support function in the IG-ON state is executed under the condition that the update of the driving support function is completed before the vehicle V reaches the candidate location, safety can also be secured.

Second Embodiment

A second embodiment according to the present invention will be described. The present embodiment basically takes over the first embodiment, and can follow the first embodiment except for the matters mentioned below.

The update of the driving support device using the update data may be performed during a period in which the vehicle V is stopped in the IG-ON state to wait for a traffic light. For example, since the travel support function and the parking support function do not operate in a state where the vehicle V is stopped, the functions may be updated while waiting for a traffic light. In the example of FIG. 4, the update of the collision prevention support during the IG-ON is prohibited. However, the update of the function may be performed while the vehicle V waits for a traffic light because the vehicle V does not operate in a stopped state. That is, as a situation in which the driving support function may be activated, there is an example in which the stopped vehicle V starts by, for example, switching of a traffic light from a red light to a green light.

The support control unit 17 acquires a timing (hereinafter, also referred to as "switching timing") at which a traffic light indicating a red light with respect to the vehicle V is switched to a green light by an intelligent transport system (ITS) via the acquisition unit 16. Then, the support control unit 17 compares the switching timing with the update completion time to determine whether the timing is later than the update completion time. When the switching timing is later than the update completion time, the support control unit 17 updates the driving support function in the IG-ON state while waiting for a signal. Here, in the present embodiment, the additional condition for permitting the update of the driving support function can include that a state in which another surrounding vehicle is stopped is detected by the surrounding detection unit 11. Moreover, according to the present embodiment, it is possible to efficiently and safely update the driving support function.

Other Embodiments

The driving support program described in the above embodiment is supplied to the driving support device 10 via a network or a storage medium, and a computer (for example, one or more processors constituting the support control unit 17) of the driving support device 10 can read and execute the program. The present invention can also be realized by such an aspect.

Summary of Embodiments

[Item 1] A driving support device of the above-described embodiment is a driving support device (e.g. 10) for supporting driving of a vehicle (e.g. V), the driving support device comprising:
 a detection unit (e.g. 15) configured to detect a current position of the vehicle;
 an acquisition unit (e.g. 16) configured to acquire data for updating a driving support function equipped on the vehicle;
 a control unit (e.g. 17) configured to control update of the driving support function based on the data acquired by the acquisition unit,
 wherein the control unit is configured to execute the update in a state in which an ignition of the vehicle is on, in a case of determining, based on the current position detected by the detection unit, that the update is to be completed before reaching a situation in which the driving support function may be activated.

According to this item, since the update of the driving support function is executed in a state where the ignition of the vehicle is on, the driving support function can be efficiently updated. In addition, since the update of the driving support function in the state where the ignition of the vehicle is on is executed under the condition that the update of the driving support function is completed before reaching the situation where the driving support function may be activated, safety can also be secured.

[Item 2] In the driving support device according to the above item 1,
 the situation includes that the vehicle reaches a candidate location where the driving support function may be activated.

According to this item, the update of the driving support function is performed in a state where the ignition of the vehicle is turned on under the condition that the update of the driving support function is completed before the vehicle reaches the candidate location. Therefore, it is possible to efficiently and safely update the driving support function.

[Item 3] In the driving support device according to the above item 2,
 the control unit is configured to determine whether the update is to be completed before the vehicle reaches the candidate location by comparing a first time at which the vehicle is predicted to reach the candidate location based on the current position detected by the detection unit with a second time at which the update is predicted to be completed.

According to this item, it is possible to accurately determine whether the update of the driving support function is completed before the vehicle reaches the candidate location in terms of time.

[Item 4] In the driving support device according to the above item 3,
 the control unit is configured to determine that the update is to be completed before the vehicle reaches the candidate location in a case where the first time is later than the second time.

According to this item, it is possible to accurately determine whether the update of the driving support function is completed before the vehicle reaches the candidate location in terms of time.

[Item 5] In the driving support device according to the above item 2, the control unit is configured to determine whether the update is completed before the vehicle reaches the candidate location according to a distance from the current position detected by the detection unit to the candidate location.

According to this item, it is possible to accurately determine whether the update of the driving support function is completed before the vehicle reaches the candidate location from a spatial viewpoint (viewpoint of distance).

[Item 6] In the driving support device according to the above item 5, the control unit is configured to determine that the update is to be completed before the vehicle reaches the candidate location in a case where the distance is equal to or greater than a threshold value.

According to this item, it is possible to accurately determine whether the update of the driving support function is completed before the vehicle reaches the candidate location from a spatial viewpoint (viewpoint of distance).

[Item 7] In the driving support device according to any one of the above items 1 to 6, the driving support function is a travel support function of supporting travel of the vehicle on a specific road.

According to this item, it is possible to efficiently and safely update the driving support function on the specific road such as an expressway or an automobile exclusive road.

[Item 8] In the driving support device according to the above item 7, the control unit is configured to execute the update in a state where the ignition of the vehicle is on, in a case of determining that a first additional condition is satisfied in addition to determining that the update is to be completed before reaching the situation, and the first additional condition includes traveling on a road other than the specific road.

According to this item, the driving support function on the specific road can be updated more safely.

[Item 9] In the driving support device according to the above item 8, the first additional condition further includes that a distance from the current position detected by the detection unit to an entrance of the specific road is a first predetermined value or more.

According to this item, it is possible to more safely update the driving support function on the specific road.

[Item 10] In the driving support device according to any one of the above items 1 to 6, the driving support function is a parking support function for supporting parking of the vehicle.

According to this item, it is possible to efficiently and safely update the driving support function related to parking of the vehicle.

[Item 11] In the driving support device according to the above item 10, the control unit is configured to execute the update in a state where the ignition of the vehicle is on, in a case of determining that a second additional condition is satisfied in addition to determining that the update is to be completed before reaching the situation, and the second additional condition includes that the vehicle is traveling on a specific road.

According to this item, it is possible to more safely update the driving support function related to parking of the vehicle.

[Item 12] In the driving support device according to the above item 11, the second additional condition further includes that a distance from the current position detected by the detection unit to an exit of the specific road or a rest facility is a second predetermined value or more.

According to this item, it is possible to more safely update the driving support function related to parking of the vehicle.

[Item 13] In the driving support device according to any one of the above items 1 to 12, the control unit is configured to execute the update in a case of confirming that a user of the vehicle has a right necessary for the update.

According to this item, it is possible to prevent the update from being performed when the user of the vehicle does not have the right necessary for updating the driving support function.

The invention is not limited to the foregoing embodiments, and various variations/changes are possible within the spirit of the invention.

What is claimed is:

1. A driving support device for performing a plurality of types of driving supports in a vehicle, the driving support device comprising:

a sensor configured to detect a current position of the vehicle;

a communication device configured to perform wireless communication with a server to acquire, from the server, data for updating a driving support function equipped on the vehicle;

at least one processor circuit with a memory comprising instructions, that when executed by the processor circuit, cause the at least one processor circuit to control update of the driving support function based on the data acquired by the communication device, for each of a plurality of types of driving support functions, wherein the instructions further cause the at least one processor circuit to at least:

determine whether the update is to be completed before reaching a situation in which the driving support function may be activated, depending on whether an update condition set for each of the plurality of types of driving support functions is satisfied, based on the current position detected by the sensor; and execute the update in a state in which an ignition of the vehicle is on, in a case of determining that the update is to be completed before reaching the situation.

2. The driving support device according to claim 1, wherein the situation includes that the vehicle reaches a candidate location where the driving support function may be activated.

3. The driving support device according to claim 2, wherein the instructions further cause the at least one processor circuit to at least determine whether the update is to be completed before the vehicle reaches the candidate location by comparing a first time at which the vehicle is predicted to reach the candidate location based on the current position detected by the sensor with a second time at which the update is predicted to be completed.

4. The driving support device according to claim 3, wherein the instructions further cause the at least one processor circuit to at least determine that the update is to be completed before the vehicle reaches the candidate location in a case where the first time is later than the second time.

5. The driving support device according to claim 2, wherein the instructions further cause the at least one processor circuit to at least determine whether the update is completed before the vehicle reaches the candidate location according to a distance from the current position detected by the sensor to the candidate location.

6. The driving support device according to claim 5, wherein the instructions further cause the at least one processor circuit to at least determine that the update is to be completed before the vehicle reaches the candidate location in a case where the distance is equal to or greater than a threshold value.

7. The driving support device according to claim 1, wherein
the plurality of types of driving support functions include a travel support function of supporting travel of the vehicle on a specific road which is an expressway and/or an automobile exclusive road, and
the update condition set for the travel support function includes traveling on a road other than the specific road, in addition to determining that the update is to be completed before reaching the situation.

8. The driving support device according to claim 7, wherein the first additional condition further includes that a distance from the current position detected by the sensor to an entrance of the specific road is a first predetermined value or more.

9. The driving support device according to claim 1, wherein the plurality of types of driving support functions include a parking support function for supporting parking of the vehicle.

10. The driving support device according to claim 9, wherein the instructions further cause the at least one processor circuit to at least execute the update of the parking support function in a state where the ignition of the vehicle is on, in a case of determining that a second additional condition is satisfied in addition to determining that the update is to be completed before reaching the situation, and
the second additional condition includes that the vehicle is traveling on a specific road.

11. The driving support device according to claim 10, wherein the second additional condition further includes that a distance from the current position detected by the sensor to an exit of the specific road or a rest facility is a second predetermined value or more.

12. The driving support device according to claim 1, wherein the instructions further cause the at least one processor circuit to at least execute the update in a case of confirming that a user of the vehicle has a right necessary for the update.

13. A vehicle comprising the driving support device according to claim 1.

14. A driving support method for performing a plurality of types of driving supports in a vehicle, the method comprising:
detecting a current position of the vehicle;
acquiring data for updating a driving support function equipped on the vehicle; and
controlling update of the driving support function based on the acquired data, for each of a plurality of types of driving support functions,
wherein the controlling includes,
determining, based on the detected current position, whether the update is to be completed before reaching a situation in which the driving support function may be activated, depending on whether an update condition set for each of the plurality of types of driving support functions is satisfied; and
executing the update in a state where an ignition of the vehicle is on, in a case of determining that the update is to be completed before reaching the situation.

15. A non-transitory computer-readable storage medium storing a program for causing a computer to execute a driving support method according to claim 14.

16. A driving support device for performing a plurality of types of driving supports in a vehicle, the driving support device comprising:
a sensor configured to detect a current position of the vehicle;
a communication device configured to perform wireless communication with a server to acquire, from the server, data for updating a driving support function equipped on the vehicle;
at least one processor circuit with a memory comprising instructions, that when executed by the processor circuit, cause the at least one processor circuit to control update of the driving support function based on the data acquired by the communication device, for each of a plurality of types of driving support functions,
wherein the plurality of types of driving support functions includes a function where the update is executed in a state in which an ignition of the vehicle is on, in a case of determining that the update is to be completed before reaching a situation in which the driving support function may be activated, based on the current position detected by the sensor, and a function where the update is not executed in the state in which the ignition of the vehicle is on.

17. The driving support device according to claim 16, wherein the function where the update is not executed in the state in which the ignition of the vehicle is on is either a collision prevention support function, a visual support function or a recognition support function.

* * * * *